Patented Sept. 25, 1951

2,569,203

UNITED STATES PATENT OFFICE 2,569,203

CONTINUOUS PROCESS FOR PRODUCING BUTTER

Alf Lennart Stigen, Stockholm, Sweden, assignor to Aktiebolaget Separator, Stockholm, Sweden, a corporation of Sweden No Drawing. Application December 31, 1948, Serial No. 68,730. In Sweden January 22, 1948

5 Claims. (Cl. 99—119)

This invention relates to an improved process for continuously producing butter by cooling highly concentrated cream.

Cream is an emulsion of the oil-in-water type, with the fat globules as the dispersed phase and the milk plasma as the continuous phase. When the cream is converted into butter, there takes place, among other changes, a phase conversion into an emulsion of the water-in-oil type, in which the fat constitutes the continuous phase and the water the dispersed phase. When producing butter from a cream which has been concentrated to the fat content of butter, this phase conversion can be brought about continuously, for instance by rapidly cooling the cream to a low temperature. During this cooling process, a fat crystallization also takes place, which is influenced by the cooling speed and the cooling temperature. These two factors therefore have a great influence on the consistency of the butter produced. If the cooling is effected very rapidly and to a low temperature, then a butter is obtained which comprises small fat crystals and has a hard consistency. On the other hand, when the cooling is effected more slowly and to a higher temperature, larger fat crystals are formed, and the butter acquires a softer consistency.

It is necessary, in order to obtain a complete phase conversion when producing butter continuously, to cool the cream rather rapidly to at least +14° C. However, by the time it has been cooled to this temperature, the butter fat has a tendency to form fat crystals so small that the butter obtains an undesired hard consistency, this tendency varying somewhat with the chemical composition of the butter fat.

The present invention has for its principal object the provision of an improved process of the character described, by which the crystallization of the butter fat can be controlled so as to obtain the desired consistency of the final butter.

In the practice of the new process for continuous production of butter, highly concentrated cream (preferably standardized to the fat content desired in the final butter) is cooled to a temperature of +14° C. or lower, so as to obtain a complete phase conversion from an emulsion of the fat-in-water type into another of the water-in-fat type. By means of a subsequent thermal treatment of the butter, the crystallization of the butter fat is influenced in a direction having regard to the desired consistency of the final butter, that is, the consistency desired in each case. This thermal treatment for altering the crystallization is effected after cooling to the above-mentioned temperature and consists, first, in heating the butter to a temperature between 18 and 30° C., and then cooling it to the storing temperature.

When cooling the butter down to the storing temperature, it can be treated in two different ways. The cooling either is carried out slowly and without a simultaneous mechanical working of the butter, for instance, by merely storing the butter in a refrigerated storing room; or is effected by submitting the butter, after heating, first to a rapid cooling to a temperature not below 17° C. and then to a slow cooling to the storing temperature without being simultaneously worked. Thus, in the last mentioned case, the cooling is made in two stages after the heating step. The first stage is preferably carried out immediately in connection with and in the same apparatus as the phase-converting cooling step and the subsequent heating step. The second stage is preferably carried out by conveying the butter into and storing it in a cooled storing room. By such a procedure, the advantage is gained that considerably smaller requirements need be put on the cooling capacity of the storing room.

The invention is based essentially on the discovery that in the production of butter continuously by cooling high-concentration cream, the butter obtains the most suitable hardness number if after the main cooling operation for the phase conversion it is heated to a temperature within the mentioned temperature range of 18–30° C. and then re-cooled to the storage temperature. It has been found by tests that if a heating is effected to a temperature of 25–26° C., then the lowest hardness number is obtained, which is generally desired when producing butter in this manner. The temperature at which the hardness number of the butter obtains its lowest value cannot be determined with complete accuracy, as it is influenced, for instance, by changes in the composition, etc., of the butter depending on the season of the year. However, by heating to the above-mentioned temperature range there is a marked improvement in the butter with respect to the hardness factor in any case, and within this range the optimum temperature for obtaining the lowest hardness number can be determined empirically in each case, if desired.

I claim:

1. In the continuous production of butter by cooling high-concentration cream to a temperature at least as low as +14° C., to obtain a complete phase conversion from an emulsion of the fat-in-water type into another of the water-in-fat type, the improvement which comprises, after said cooling, heating the butter to a temperature of 18–30° C., and then re-cooling the butter to the storing temperature.

2. The improvement according to claim 1, in which the re-cooling of the butter to the storing temperature is carried out slowly and in the absence of mechanical working of the butter.

3. The improvement according to claim 1, in which the re-cooling of the butter to the storing temperature is carried out slowly and in the absence of mechanical working of the butter, by storing the heated butter in a cooled storing space.

4. The improvement according to claim 1, in which the re-cooling of the butter to the storing temperature is effected by subjecting it, immediately after the heating, to rapid cooling to a temperature no lower than 17° C., and then cooling it to the storing temperature slowly and in the absence of mechanical working.

5. The improvement according to claim 1, in which the re-cooling of the butter to the storing temperature is effected by subjecting it, immediately after the heating, to rapid cooling to a temperature no lower than 17° C., and then cooling it to the storing temperature slowly and in the absence of mechanical working, by storing the partly re-cooled butter in a cooled storing space.

ALF LENNART STIGEN.

REFERENCES CITED

The following references are of record in the file of this patent:

UNITED STATES PATENTS

| Number | Name | Date |
|---|---|---|
| 870,217 | Borgstrom | Nov. 5, 1907 |
| 2,406,819 | Farrall | Sept. 3, 1946 |
| 2,461,117 | Lindgren | Feb. 8, 1949 |